United States Patent
Gasloli (10) Patent No.: US 7,147,794 B2
(45) Date of Patent: Dec. 12, 2006

(54) COATING FOR FORMING A HIGH DEFINITION APERTURE

(75) Inventor: Paul J. Gasloli, Santa Rosa, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 104 days.

(21) Appl. No.: 10/930,094

(22) Filed: Aug. 31, 2004

(65) Prior Publication Data

US 2005/0024745 A1    Feb. 3, 2005

Related U.S. Application Data

(62) Division of application No. 10/155,493, filed on May 24, 2002, now abandoned.

(51) Int. Cl.
*C23F 1/00* (2006.01)

(52) U.S. Cl. ............................ 216/75; 216/76; 216/101

(58) Field of Classification Search ................ 216/75, 216/76, 101
See application file for complete search history.

(56) References Cited

U.S. PATENT DOCUMENTS

| | | | |
|---|---|---|---|
| 3,711,171 A | 1/1973 | Orkin et al. | 308/241 |
| 5,514,503 A | 5/1996 | Evans et al. | 430/7 |
| 5,566,011 A | 10/1996 | Steigerwald | 359/67 |
| 5,666,177 A | 9/1997 | Hsieh et al. | 349/111 |
| 5,808,714 A * | 9/1998 | Rowlands et al. | 349/110 |
| 6,077,621 A * | 6/2000 | Allen et al. | 429/33 |
| 6,424,402 B1 * | 7/2002 | Kishimoto | 349/156 |

* cited by examiner

*Primary Examiner*—Nadine Norton
*Assistant Examiner*—Binh X. Tran
(74) *Attorney, Agent, or Firm*—Allen, Dyer, Doppelt, Milbrath & Gilchrist, P.A.

(57) ABSTRACT

An optical thin film stack for a dark aperture is deposited using thermal ion-assisted deposition ("IAD"). The IAD provides an energetic deposition of chromium and chromium oxide that results in a dark mirror optical thin film stack with superior etch properties. Edge definition is improved, and the edge profile is controllable by the selection of IAD parameters. An in situ IAD cleaning process can be used to clean the substrate sufficiently so that an intermediate adhesion layer of chromium is not required.

18 Claims, 5 Drawing Sheets

COATING FOR FORMING A HIGH DEFINITION APERTURE

CROSS-REFERENCE TO RELATED APPLICATION

The present application is a divisional application of U.S. patent application Ser. No. 10/155,493, filed on May 24, 2002 now abandoned, entitled "Coating For Forming A High Definition Aperture", assigned to the assignee of the present application, and the disclosure of which is incorporated herein.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

The present invention relates generally to optical apertures, and more specifically to an optical window having a dark aperture that may be used in packaging digital mirror display ("DMD's")-type spatial light modulators ("SLM'S") and other optical devices.

DMD's are a type of SLM that are used in display technology. DMD's are basically an array of very small mirrors fabricated using photolithographic techniques adapted from semiconductor fabrication. The mirrors, which are commonly referred to as pixels, are modulated with electronic signals to direct light incident on the mirrors in different directions. One DMD has 800 by 600 pixels and consists of an array of 16 by 16 μm tiltable aluminum mirrors mounted on hinges over a complementary metal-oxide-semiconductor ("CMOS") static random access memory (SRAM) chip, where the mirrors are arranged on a 17-μm pitch to provide a fill factor of nearly 90%. The chip is typically packaged in a package providing the electrical pin-out connections and having a window for coupling light to and from the mirror array.

In many cases, the window is a piece of glass and an aperture is formed defining a clear center portion surrounded by a dark perimeter. The perimeter outlines the active area of the DMD, and traps stray or scattered light in the optical system. In some devices, the dark aperture is formed from alternating thin film layers of chromium oxide (nominally $Cr_2O_3$) and chromium formed by either a lift-off or etch method that forms a dark mirror interference stack.

It is desirable that the edge of the aperture is sharply defined, and also that the aperture be aligned with the active pixel area of the DMD. Unfortunately, defining the aperture can leave a relatively ragged edge. This edge can form a bright reflective region at the aperture edge and appear as a thin border around a projected image. In some products, several rows of otherwise good mirrors underlying the aperture edge are intentionally not active, thus consuming excess chip area and reducing the potential yield of chips per wafer because of the ragged aperture edge.

Another problem that can arise is delamination of the thin film stack from the substrate. A chromium layer is often included to promote adhesion of the thin film stack to the glass substrate of the window; however, this chromium layer can limit how dark the thin film stack is. Gross delamination of the dark aperture can occur if the adhesion layer is simply omitted.

Therefore, a window for an optical package that has a dark aperture with fine edge definition and with reduced edge reflection is desirable.

BRIEF SUMMARY OF THE INVENTION

A dark mirror thin film stack of alternating layers of metal and metal oxide(s) is deposited using ion-assisted deposition ("IAD"). The characteristics of the layers in the thin film stack, for example the etch characteristics and reflectivity, can be selectively modified by controlling the deposition parameters. It is believed that varying the IAD deposition parameters can be used to control the density of the layers, and hence the etch characteristics. In a further embodiment, an IAD cleaning step is performed in situ to prepare a glass substrate for the dark mirror thin film stack. The in situ IAD clean allows a thin film stack to be deposited on the glass wherein the first layer is chromium oxide, rather than chromium. This provides a darker mirror.

One embodiment of the invention provides an optical aperture formed on a glass substrate. The optical aperture includes a dark mirror thin film structure forming a dark field portion of the optical aperture, and a clear field portion. In a particular embodiment, the clear field portion of the optical aperture is defined by a smooth aperture edge. In one embodiment, the aperture edge has an edge definition of less than 20 microns. In another embodiment, the aperture edge has an edge definition of less than 10 microns, and in another embodiment, the aperture edge has an edge definition of about 5 mircons. In another embodiment, the aperture edge has a selected edge profile between about 1–60 degrees. The IAD conditions during deposition of the dark mirror thin film stack can be selectively varied to attain the desired edge profile.

DETAILED DESCRIPTION OF THE INVENTION

I. Introduction

A dark aperture is formed using IAD and conventional wet etch techniques. It is believed that IAD provides denser layers than are typically attained with thermal evaporative techniques, and that the denser layers avoid undercutting during the etch process. If undercutting occurs, bright reflective regions may form around the perimeter of the aperture, which can create undesirable effects on an image projected through the aperture. Undercutting can also result in a jagged edge.

II. An Exemplary Dark Aperture

Figure 1:
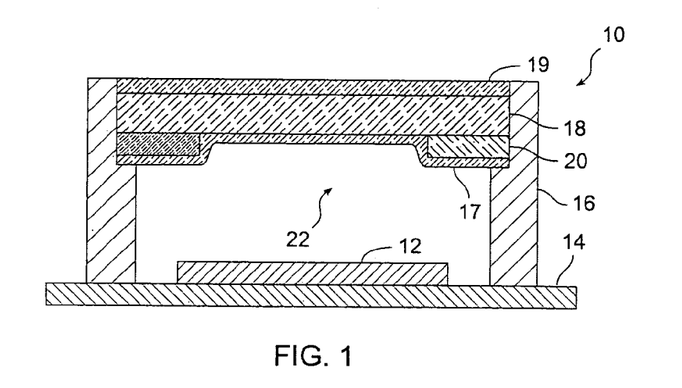
FIG. 1 is a simplified cross section of a portion of a packaged DMD.

FIG. 1 is a simplified cross section of a portion of a packaged DMD 10. An SLM chip 12 is mounted on a base 14 of a package. The base includes a stamped metal shroud 16 or "hat" with an opening that accepts a glass package top 18. A dark coating stack 20 is deposited on the glass package top and an aperture or window 22 is formed in the coating stack through which light can enter and exit the packaged DMD. In a particular embodiment, the shroud is made of KOVAR™ and the glass is sealed to the shroud. The package is thus hermetically sealed to protect the chip and maintain its surrounding environment.

The SLM chip 12 has a large number of individually activated mirrors. In current designs, it is common to not activate mirrors unless they are under the clear window. Thus, the pixels under the slight overlap of the dark coating stack would not be utilized.

The dark coating stack is a series of thin film layers designed as a "dark mirror". While many optical designs are possible, an example of a suitable coating stack is a 40 nm layer of chromium oxide ($Cr_xO_y$, nominally $Cr_2O_3$) deposited on the glass substrate, followed by a 10 nm layer of Cr, followed by another 40 nm layer of $Cr_2O_3$, followed by a 130 nm layer of Cr. The dark mirror is oriented so that the last layer of chromium is toward the SLM, i.e. is the last layer of the dark mirror stack deposited on the glass substrate. Prior art designs used a thin layer of chromium metal as the first layer to promote adhesion between the dark mirror thin film stack and the glass substrate; however, these thin film stacks were not as dark. Thin film stacks utilizing a chromium adhesion layer typically achieved a reflectivity greater than 15%, while similar thin film stacks without the chromium adhesion layer achieved reflectivities from about 15% to less than 1%. Anti-reflective ("AR") coatings 17, 19 may be added on one or both sides of the glass substrate to reduce transmission losses and reflection off the package top.

The window in the glass top is made by etching the dark coating stack using spin-on photo-resist and conventional wet chemical etching techniques. In other instances, a plasma etch or a lift-off process can be used. In the case of wet chemical etching of a thin film stack deposited using electron beam ("E-beam") evaporative deposition methods, a bright periphery was noticed around the edge of the window. This caused flaring of light modulated by the DMD. It was also noted that the top chromium layer had a reflectivity of about 50%, compared to a bulk reflectivity of about 60%.

Analysis showed a jagged edge that extended up to 20 microns from the desired edge of the aperture, essentially a flap of chromium and/or chromium oxide. It was thought that the propensity for forming the jagged flap was related to the preferential etching of the layers in the thin film stack. In other words, the layers were not etching uniformly, but that one of the underlying layers etched more rapidly than the overlying ("top") chromium layer, or vice versa. It was discovered that modifying the density of the chromium and/or chromium oxide layers could provide a higher quality aperture with a smoother edge and without the bright perimeter.

It was thought that the low reflectivity of the top chromium layer indicated a layer with relatively low density, and that a more energetic deposition process might produce a denser layer and reduce the formation of the jagged edge. Deposition the chromium and chromium oxide layers in the thin film stack using sputtering techniques provided a dark mirror thin film stack that etched uniformly with a smooth aperture edge. It is believed that sputtering achieved denser layers because the reflectivity of the top chrome layer was about 60%, versus about 50% for a similar E-beam deposited layer. However, the relatively thick layers tended to arc to the nearest electrical ground as they became charged.

Ion-assisted evaporation or ion-assisted thermal deposition ("IAD") uses a broad beam ion source to direct an energetic ion beam simultaneous with the evaporation of metal or dielectric materials onto a substrate. The ion beam can include reactive species, such as are formed from oxygen gas, or relatively non-reactive species, such as are formed from argon and similar gases. The ion source(s) is usually neutralized with an independent electron source.

IAD of the chromium/chromium oxide layers produced a top chromium layer with about 60% reflectivity, which is similar to the bulk reflectivity of chrome, and similar to the reflectivity achieved with sputtered layers. It is also believed to have modified the film growth of the $Cr_2O_3$ layer(s). When these dark mirror stacks were etched using the same wet chemical methods, the edge definition was less, and in some instances much less, than 5 microns. The variation of edge definition between etch batches also decreased. Thus, using IAD to deposit the dark mirror thin film stack improves the quality and manufacturability of the apertures.

An in situ IAD cleaning step was also found to provide a superior surface clean or preparation. Without sufficient surface cleaning, the dark mirror stack tended to delaminate from the glass. A 10 μm thick layer of chromium was added to the stack to act as an adhesion layer between the glass and the first $Cr_2O_3$ layer. It was desirable to eliminate this chromium layer to reduce reflectivity of the dark mirror thin film stack and to provide a higher level of manufacturability.

While the chromium oxide layers are described as having nominally the same stoichiometry, each layer may differ in composition. Similarly, different metal-metal oxide or other systems may be used to form dark mirrors. For example, dark mirrors according to embodiments of the present invention might be made with titanium-titanium oxide, niobium-niobium oxide, or silicon-silicon oxide systems, for example. Dark mirror thin film stacks may include mixed elements, such as one type of metal in the metal layers and another type of metal oxide in the other layers. For example, a dark mirror thin film stack might include chromium metal layers and silicon dioxide layers. However, a single-metal system, such as chromium-chromium oxide, is desirable because such systems offer the ability to use a single etchant to form the aperture, whether using a wet-chemical or plasma etch technique. Mixed metal systems might require additional etchants, and hence additional etch steps, to etch the aperture.

III. Edge Definition, Undercutting, and Delamination

Figure 2:
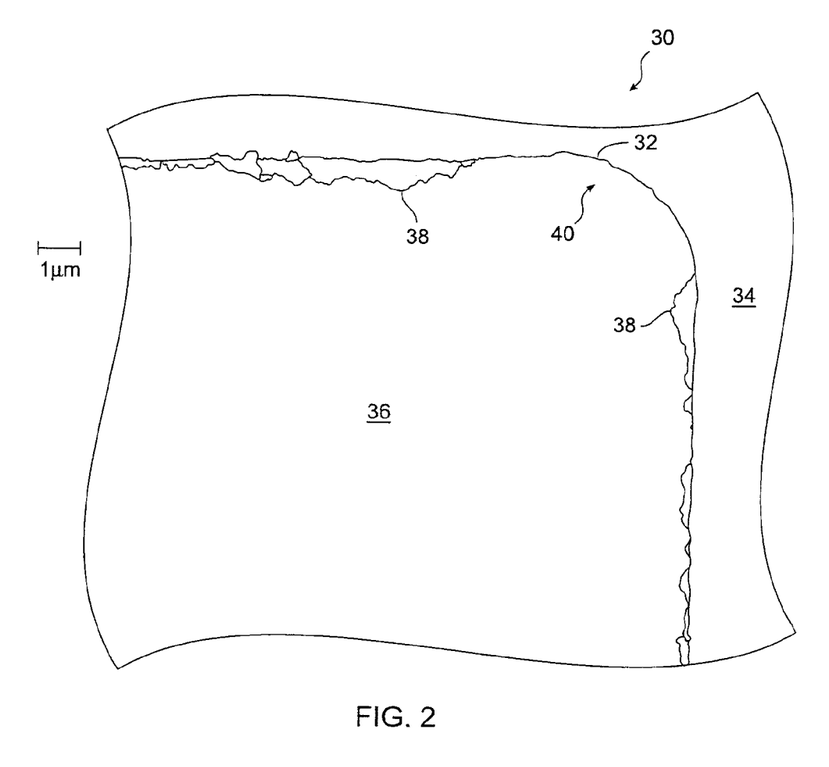
FIG. 2 is a simplified tracing of a scanning electron micrograph of a top view of an etched aperture illustrating edge definition.

FIG. 2 is a simplified tracing of a scanning electron micrograph of a top view of an etched aperture 30 illustrating edge definition. A dark mirror thin film stack of alternating Cr/Cr-oxide(s) was deposited on a glass substrate using e-beam evaporation. The perimeter 32 of the aperture is preferably defined as a sharp edge between a dark field 34 and a clear field (window) 36. A jagged edge 38 of one or more layers of the thin film stack has not been removed from the perimeter of the aperture. As discussed herein, an edge definition of 20 microns means that the greatest extension of a flap of chromium into the clear field from the perimeter is 20 microns. Some areas of the window may be free of chromium flaps, such as the corner region 40, in this example.

Figure 3:
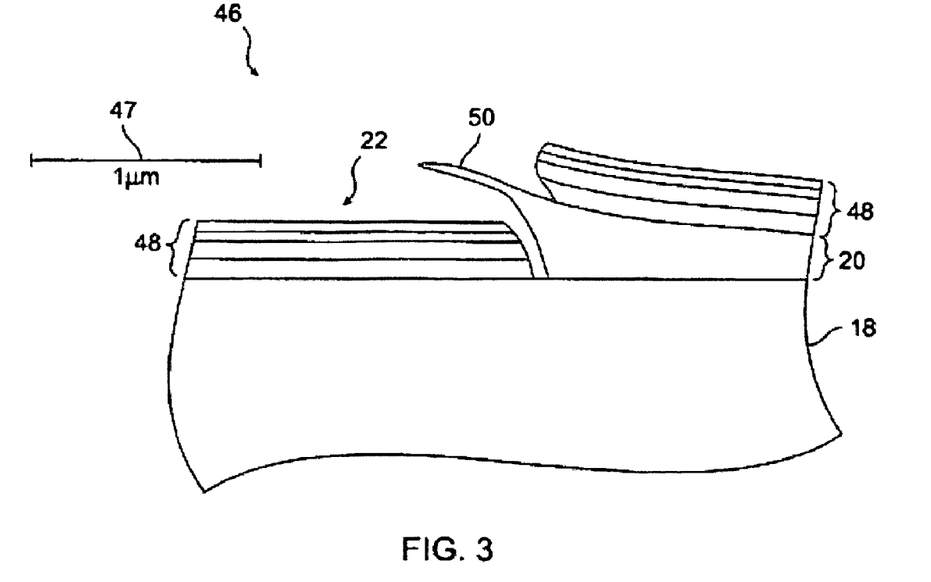
FIG. 3 is a simplified tracing of a scanning electron micrograph of a section of an aperture illustrating aperture edge undercutting.

FIG. 3 is a simplified tracing of a scanning electron micrograph of a section of an aperture 46 illustrating aperture edge undercutting. The magnification is approximately 50,000×. A 1-micron reference bar 47 is provided as an approximate scale. The dark coating stack 20 was deposited using e-beam evaporation on a glass slide 18 and etched using a wet chemical etch process to form an aperture 22. An anti-reflective ("AR") coating stack 48 was deposited over the surface of the glass slide, including the dark mirror portion. The flap 50 is shown in a simplified representation, and did not significantly shadow the edge of the clear window from the AR deposition. It is believed such a flap can form a bright periphery and cause flaring in a packaged DLM device.

Figure 4:
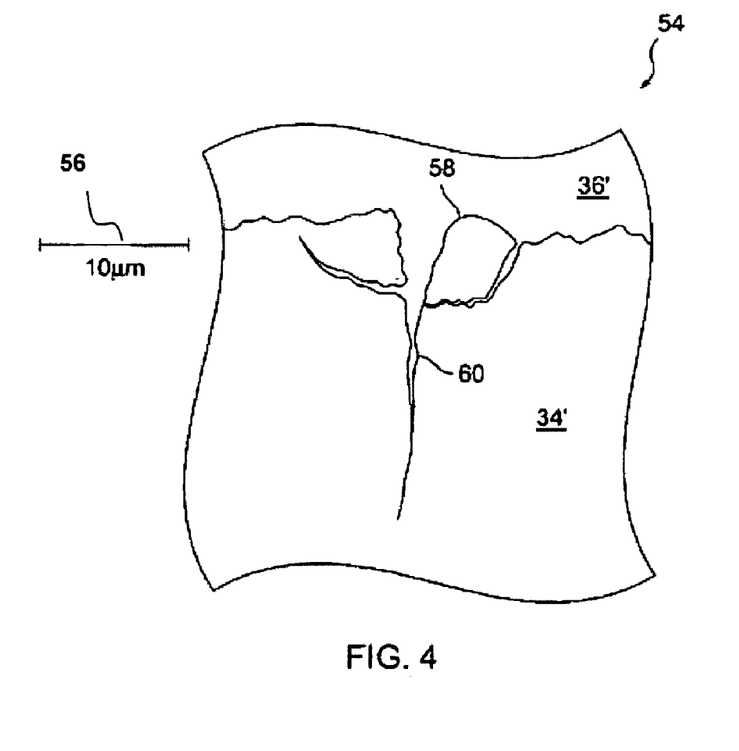
FIG. 4 is a simplified tracing of a scanning electron micrograph of a top of an aperture edge illustrating edge delamination.

FIG. 4 is a simplified tracing of a scanning electron micrograph of a portion of the top of an aperture edge 54 illustrating aperture edge delamination. A 10-micron reference bar 56 is provided for an approximate scale. The dark mirror thin film stack was deposited using e-beam techniques and the substrate was cleaned prior to deposition using an in situ glow discharge technique. The substrates were cleaned before they were loaded into the deposition chamber using detergent and water. The thin film stack included a chromium layer as the first-deposited layer.

The magnification was approximately 6,500×. A piece 58 of the dark coating stack appears to have completely delaminated from the glass substrate and has partially lodged under the dark field 34' of the aperture. A crack 60 appears to have propagated from the clear portion 36' of the aperture into the dark field 34'. The dislodged particle(s) could cause a device failure if it fell onto the SLM chip. The delamination also degrades the quality of the aperture edge. It is believed that the crack extends through at least the upper chromium layer in the dark coating stack, but it is unclear whether the observed delamination and cracking arose solely due to device processing. In other words, the focused ion beam of the electron microscope may have contributed to the apparent defects.

It is believed that the defects arose primarily due to a combination of factors in the fabrication process. First, the wet chemical etch may not have etched all layers in the coating stack at an equal rate, which is believed to arise at least partially because of differences in the density of the layers. Second, the in situ substrate cleaning was not sufficient to avoid gross delamination.

One approach to solving delamination was to improve the cleaning process prior to depositing the dark coating stack. An energetic IAD clean was found to improve adhesion sufficiently to allow omitting a chromium adhesion layer between the glass and the first chromium oxide layer. The IAD surface clean is performed using an $O_2$/Ar scrub at 3 amperes of anode current, which was about 50 micro-amps/cm2 at about 51 cm, and 70 eV beam energy without a deposition source in an IAD e-beam evaporation system. The IAD energies are about the same as normally used during deposition but higher than glow discharge, and it was found that the in situ clean was sufficiently aggressive to increase adhesion of $Cr_2O_3$ to allow the elimination of the chromium base (adhesion) layer. In comparison, dark mirror stacks deposited on glass substrates after cleaning in situ with a glow discharge technique tended to delaminate from the substrate.

IV. Edge Profile

FIGS. 5A–5D are simplified tracings of scanning electron micrographs of portions of a top of an aperture edge illustrating an edge profile for a first set of deposition parameters according to one embodiment of the present invention. A dark mirror thin film stack as described in accordance with FIG. 1 (40 nm $Cr_2O_3$, 10 nm Cr, 40 nm $Cr_2O_3$, and 130 nm Cr) was deposited for the examples illustrated in FIGS. 5A–5D. An in situ IAD clean was performed before depositing the thin film layers.

After determining that depositing the dark coating stack using IAD could be used to control film growth and improve edge definition, further investigation demonstrated that the profile (i.e. angle of the edge) of the aperture could be controlled by varying IAD parameters, using a conventional wet chemical etch. A controllable etch profile range from about 12.0 microns to about 0.5 microns was demonstrated. This is roughly equivalent to an etch angle of about 1 degree to about 47 degrees (from the surface of the glass substrate) for a thin film stack having a total thickness of about 0.3 microns. It is believed that steeper profiles are attainable and that edge profiles of at least 60 degrees may be obtained. A profile between about 30 degrees to about 60 degrees, more preferably between about 45 to about 60 degrees.

Two parameters that were found to be significant in controlling the edge profile were anode current and the ratio of the partial pressure of oxygen to argon in the deposition chamber. The anode current is related to the energy delivered to the part during deposition. The anode current and the $O_2$:Ar ratio were changed between the layers, and the stated ratios are for the deposition of the $Cr_2O_3$ layer. The oxygen was essentially turned off during deposition of the middle and top chromium layers. It is believed that the edge profile can be controlled by depositing the metal and/or oxide layers under selected IAD conditions. The exact profile obtained typically depends at least in part on the etchant used and etching conditions, such as concentration, agitation, and temperature in a wet-chemical etch process, for example, so the following specific process parameters are exemplary only.

The gas mixture was adjusted by changing the flow rates of oxygen and argon into the deposition chamber. The estimated partial pressures were calculated from the flow rates and chamber pressure. For simplicity of discussion, the relative flow rates will be expressed as a ratio of oxygen ($O_2$):argon gas (Ar), with the flow rate of argon being 1 (arbitrary units). Those of ordinary skill in the art understand that the absolute flow rate(s) depend on several conditions, such as chamber size, chamber pressure, and exhaust rate.

Figure 5A:
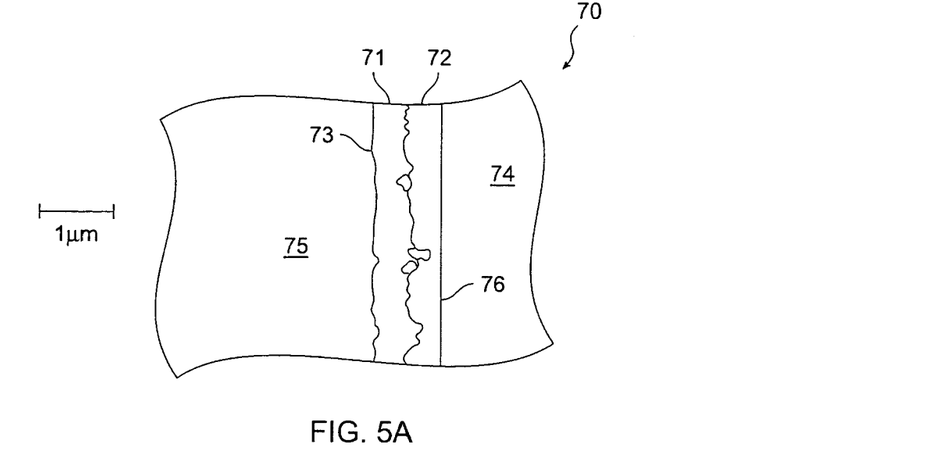
FIG. 5A is a simplified tracing of a scanning electron micrograph of a top of an aperture edge illustrating an edge profile for a first set of deposition parameters according to one embodiment of the present invention.

FIG. 5A is a simplified tracing of a scanning electron micrograph of an aperture edge, viewed from the top, according to an embodiment of the present invention. The edge of the first $Cr_2O_3$ layer 71 is clearly seen, but the 10 nm layer of Cr is believed to be too thin to be seen in the associated scanning electron micrograph. The first 71 and second 72 layers of $Cr_2O_3$ were deposited at a current of 3.0 amps and an oxygen:argon flow rate ratio of 3.2, which is believed to provide a partial pressure of oxygen of about 1.3E-4 and a partial pressure of argon of about 3.0E-5 in the IAD chamber. The 10 nm thick and 130 nm thick 74 layers of Cr were deposited at an anode current of 6 amps and without oxygen, the argon being at a partial pressure of about 1.2E-4. Thus, the total dark mirror stack thickness was about 0.3 microns. The edge 73 of the thin film stack at the clear glass window 75 is about 0.75 microns from the edge 76 of the chromium layer 74. Thus the etch profile is about 0.75 micron for the 0.3 micron thin film stack, or about 20 degrees, as measured from the surface of the glass substrate.

Figure 5B:
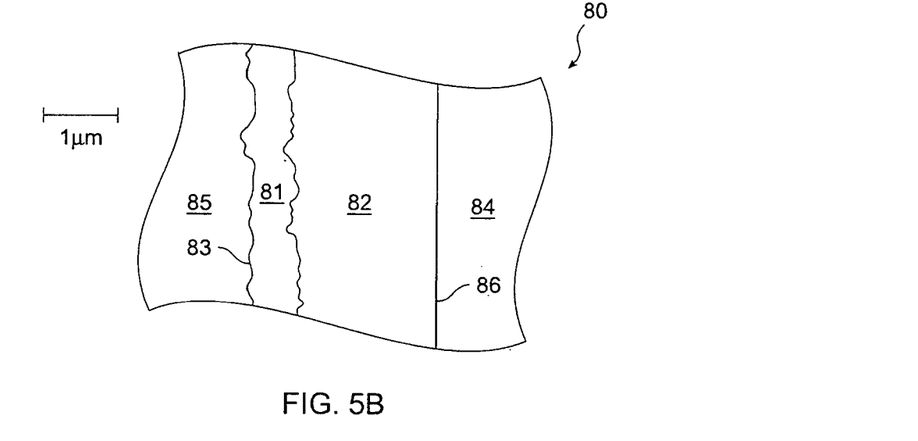
FIG. 5B is a simplified tracing of a scanning electron micrograph of a top of an aperture edge illustrating an edge profile for a second set of deposition parameters according to another embodiment of the present invention.

FIG. 5B is a simplified tracing of a scanning electron micrograph of a top of an aperture edge 80 illustrating an edge profile for a second set of deposition parameters according to another embodiment of the present invention. The current during the deposition of the $Cr_2O_3$ layers was again 3.0 amps, but the oxygen:argon flow rate ratio was 1.11, which is believed to provide a partial pressure of oxygen of about 1.0E-4 and a partial pressure of argon of about 6E-5 in the IAD chamber. The edge 83 of the thin film stack on the glass window 85 is about 1.5 microns from the edge 86 of the chromium layer 84. The edges of the first $Cr_2O_3$ layer 81 and the second $Cr_2O_3$ layer 82 are also shown. Again, the thin film stack was about 0.3 microns thick, and a 1.5 micron etch profile provides an angle of about 11 degrees.

Figure 5C:
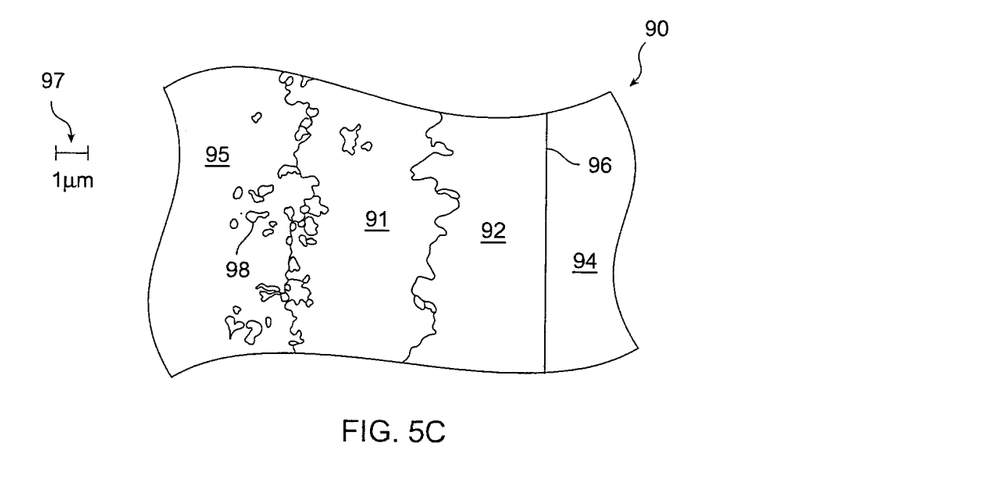
FIG. 5C is a simplified tracing of a scanning electron micrograph of a top of an aperture edge illustrating an edge profile for a third set of deposition parameters according to another embodiment of the present invention.

FIG. 5C is a simplified tracing of a scanning electron micrograph of a top of an aperture edge 90 illustrating an edge profile for a third set of deposition parameters according to another embodiment of the present invention. The current during the deposition of the $Cr_2O_3$ layers was 6 amps and the oxygen:argon flow rate ratio was 3.2. The edge 93 of the thin film stack on the glass substrate 95 is about 7 microns from the edge 96 of the chromium layer 94 (note the different 1-micron scale bar 97). The edges of the first $Cr_2O_3$ layer 91 and the second $Cr_2O_3$ layer 92 are also shown. The thin film stack was about 0.3 microns thick, and the etch profile is estimated to be about 2 degrees. As the etch profile declines toward the glass substrate 95, "islands" of material 98 (presumably $Cr_2O_3$) are not entirely removed from the glass, and the edge 93 of the thin film stack became more irregular; however, it is believed that neither the islands or the irregular edge significantly degrade the optical performance of the aperture.

Figure 5D:
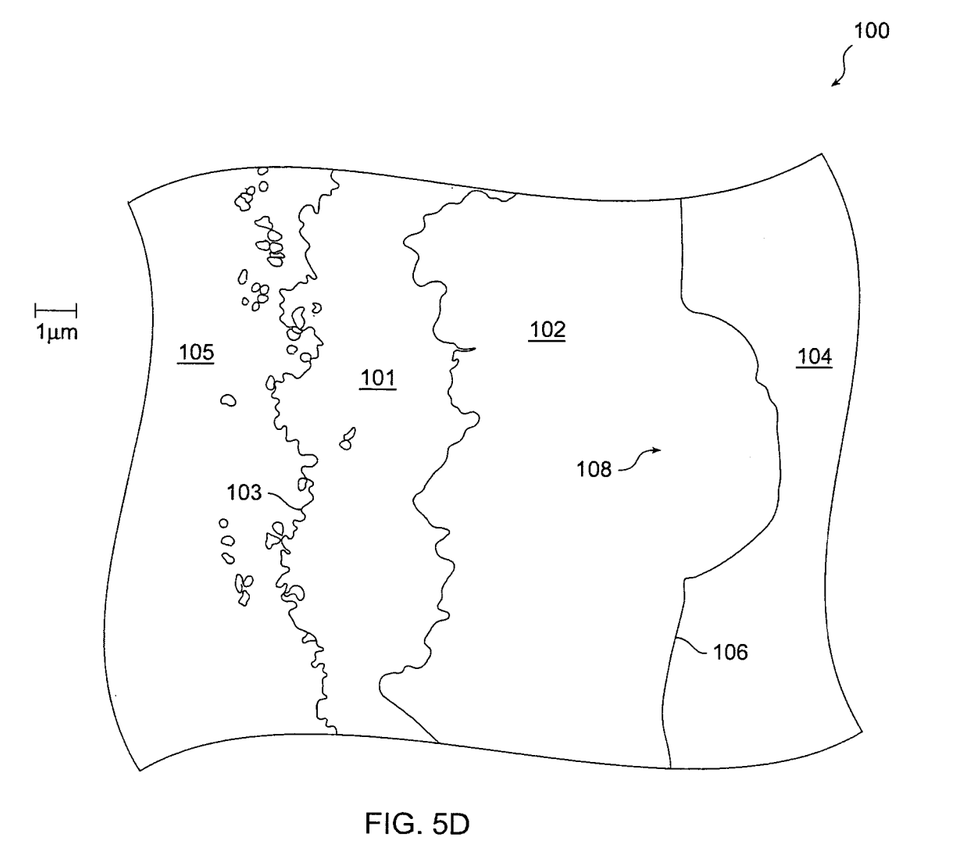
FIG. 5D is a simplified tracing of a scanning electron micrograph of a top of an aperture edge illustrating an edge profile for a fourth set of deposition parameters according to another embodiment of the present invention.

FIG. 5D is a simplified tracing of a scanning electron micrograph of a top of an aperture edge 100 illustrating an edge profile for a fourth set of deposition parameters according to another embodiment of the present invention. The current during the deposition of the $Cr_2O_3$ layers was 6 amps and the oxygen:argon flow rate ratio was 1.11, which is believed to provide a partial pressure of oxygen of about 1.0E-4 and a partial pressure of argon of about 6E-5 in the IAD chamber. The edge 103 of the thin film stack on the glass substrate 105 is about 11 microns from the edge 106 of the chromium layer 104. Note that the scale is different from FIGS. 5A, 5B, and 5C. A larger portion of the edge is illustrated in order to show an irregularity 108 in the edge 106 of the chromium layer. The cause of this irregularity is not known, but it is believed that it's location and dimension would not significantly affect the optical performance of the aperture. The edges of the first $Cr_2O_3$ layer 101 and the second $Cr_2O_3$ layer 102 are also shown. The thin film stack was about 0.3 microns thick, and the etch profile is estimated to be about 1 degree.

Thus, the edge profile obtained in a wet chemical etch of an optical thin film stack of chromium-chromium oxide layers can be controlled by selecting the deposition conditions in thermal IAD processes. In particular, edge profiles between about 1–47 degrees were obtained for the optical thin film stack described above in conjunction with a standard wet chrome etch. It is believed that steeper profiles may be obtained. It is generally desirable to have an edge profile between about 30 degrees and about 60 degrees to avoid forming a "frame" around the edge of an image transmitted through the aperture. In other words, edge profiles between 30 and 60 degrees suppress the appearance of the perimeter of the aperture in the projected image. In some embodiments, it is desirable to have an edge profile between about 30 degrees and about 45 degrees, in other embodiments it is desirable to have an edge profile between about 45 degrees and about 60 degrees.

V. Exemplary Methods

Figure 6:
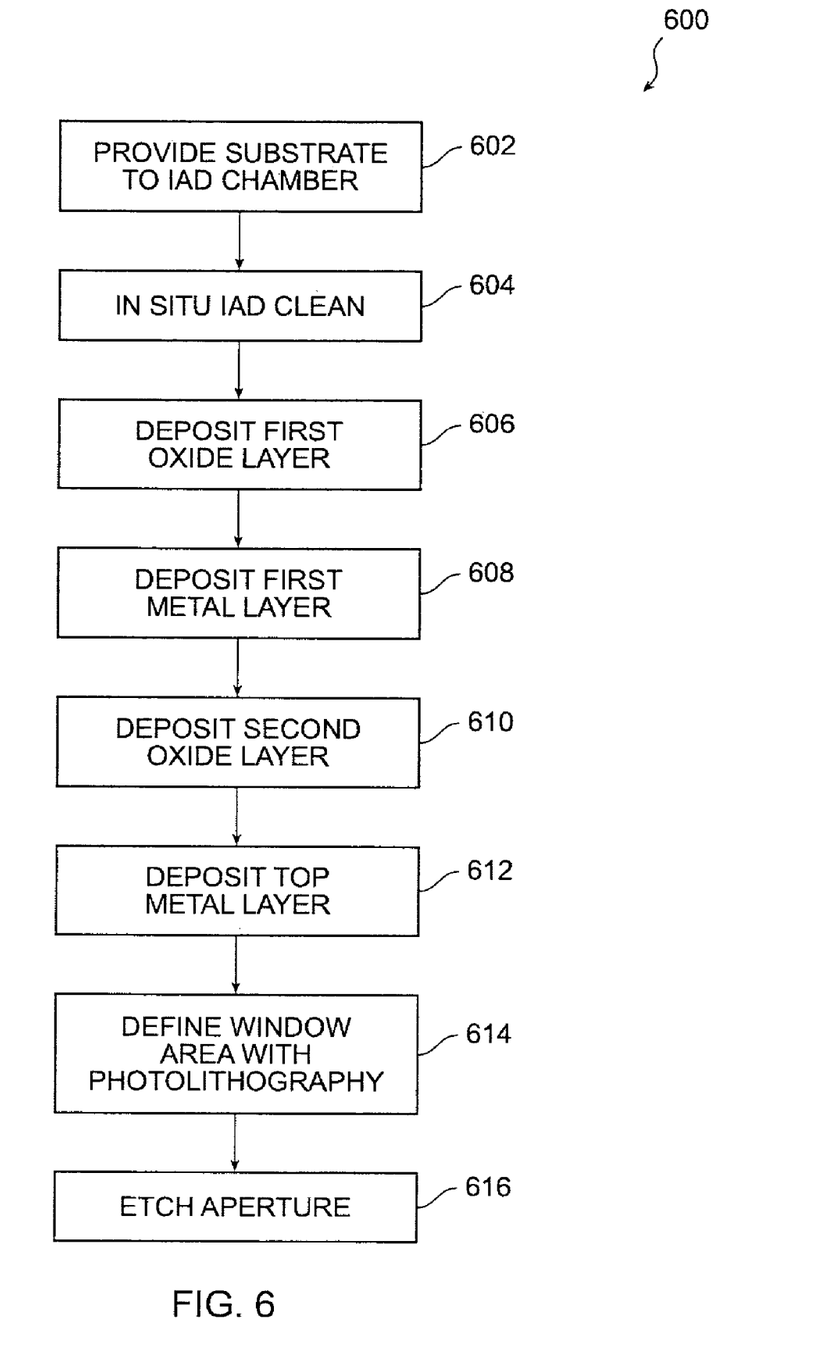
FIG. 6 is a simplified flow diagram of a method of depositing a dark reflector optical stack and forming an aperture according to an embodiment of the present invention.

FIG. 6 is a simplified flow diagram of a method 600 for depositing a dark reflector optical stack according to an embodiment of the present invention. A substrate is placed in a thermal IAD deposition chamber (step 602) and cleaned in situ (step 604) using a non-deposition IAD process. A layer of oxide, such as chromium oxide, is deposited directly on the cleaned substrate (step 606). A layer of metal, such as chromium, is deposited (step 608), and then a second layer of oxide is deposited (step 610). A top metal layer is then deposited (step 612). In a further embodiment, the layers of oxide and/or metal is deposited at an anode current and/or oxygen:argon ratio selected according to a desired edge profile. In a yet further embodiment, the top metal layer is deposited at a selected anode current and partial pressure of inert gas.

In a further embodiment, an aperture is defined using photolithography (step 614) and etching (step 616) steps to obtain the desired edge profile. In a particular embodiment, the selected edge profile after etching is between about 1 degree and about 60 degrees. In a further embodiment, the selected edge profile is between about 45 degrees and about 60 degrees. The etching may be a wet chemical etch or a plasma etch. If a single chemistry system is used (e.g. Cr—Cr-oxide or Si—Si-oxide) a single etchant may be used.

While the invention has been described above in terms of various specific embodiments, the invention may be embodied in other specific forms without departing from the spirit of the invention. Thus, the embodiments described above illustrate the invention, but are not restrictive of the invention, which is indicated by the following claims. All modifications and equivalents that come within the meaning and range of the claims are included within their scope.

I claim:

1. A method of depositing a dark reflector optical stack on a substrate, the method comprising the steps of:
    a) providing the substrate to an ion-assisted deposition ("IAD") chamber;
    b) depositing a first oxide layer at a first anode current and a first partial pressure of oxygen;
    d) depositing a first metal layer at a second anode current;
    e) depositing a second oxide layer at a third anode current and a second partial pressure of oxygen; and
    f) depositing a second metal layer at a fourth anode current;
    wherein the first selected anode current is essentially equal to the third selected anode current, and the first selected partial pressure of oxygen is essentially equal to the second selected partial pressure of oxygen.

2. The method of claim 1 wherein the first oxide layer and the second oxide layer comprise $Cr_2O_3$ and the first metal layer and the second metal layer comprise chromium.

3. The method of claim 1, further comprising a step of etching an aperture in the dark reflector optical stack, and wherein at least one of the first anode current and the third anode current are selected according to a desired etch profile.

4. The method of claim 1, further comprising a step of etching an aperture in the dark reflector optical stack, and wherein at least one of the first partial pressure of oxygen and the second partial pressure of oxygen are selected according to a desired etch profile.

5. The method of claim 1, further comprising a step of etching an aperture in the dark reflector optical stack, and wherein at least one of the second anode current and the fourth anode current are selected according to a desired etch profile.

6. The method of claim 1, further comprising a step, prior to the step b), of cleaning the substrate in the IAD chamber with an ion-assisted cleaning process.

7. The method of claim 1, wherein the second anode current is essentially equal to the first anode current.

8. A method of depositing a dark reflector optical stack on a substrate, the method comprising:
   providing the substrate to an ion-assisted deposition ("IAD") chamber;
   cleaning the substrate in the IAD chamber with an ion-assisted cleaning process;
   depositing a first chromium oxide layer at a first selected anode current and a first selected partial pressure of oxygen;
   depositing a first chromium layer at a second selected anode current;
   depositing a second chromium oxide layer at a third selected anode current and a second selected partial pressure of oxygen; and
   depositing a second layer of chromium at a fourth selected anode current
   wherein the second selected anode current is essentially equal to the first selected anode current.

9. The method of claim 8 wherein the first chromium oxide layer and the second chromium oxide layer comprise $Cr_2O_3$.

10. The method of claim 9 wherein the first selected anode current is essentially equal to the third selected anode current and the first selected partial pressure of oxygen is essentially equal to the second selected partial pressure of oxygen.

11. The method of claim 10 wherein the first selected partial pressure of oxygen is selected according to a desired edge profile.

12. A method of defining a dark apertures with selected profiles, the method comprising:
   a) forming a thin film stack on a substrate, including steps of
      providing the substrate to an ion-assisted deposition ("IAD") chamber;
      depositing a first oxide layer at a first anode current and a first partial pressure of oxygen;
      depositing a first metal layer of a metal at a second anode current;
      depositing a second oxide layer at a third anode current and a second partial pressure of oxygen; and
      depositing a second metal layer of the metal at a fourth anode current;
   b) defining a window area;
   c) etching the thin film stack from the window area resulting in the aperture having an edge profile, and
   d) repeating steps a) to c) to form another dark aperture, wherein at least one of the first anode current, the second anode current, the third anode current, the fourth anode current, the first partial pressure of oxygen, and the second partial pressure of oxygen has been adjusted to ensure the edge profile of the other dark aperture is different.

13. The method of claim 12, wherein the etching step comprises a plasma etching step.

14. The method of claim 13 wherein the plasma etching step uses a single etchant to etch the thin film stack.

15. The method of claim 12, wherein the etching step comprises a wet chemical etching step.

16. The method of claim 15 wherein the wet chemical etching step uses a single etchant to etch the thin film stack.

17. A method of defining a dark aperture with a selected edge profile comprising the steps of:
   a) forming a thin film stack on a substrate, including steps of:
      providing the substrate to an ion-assisted deposition ("IAD") chamber;
      cleaning the substrate in the IAD chamber with an ion-assisted cleaning process;
      depositing a first metal oxide layer at a first anode current and a first partial pressure of oxygen;
      depositing a first metal layer at a second anode current;
      depositing a second metal oxide layer at a third anode current and a second partial pressure of oxygen; and
      depositing a second metal layer at a third anode current;
      wherein at least one of the first anode current, the second anode current, the third anode current, the fourth anode current, the first partial pressure of oxygen, and the second partial pressure of oxygen has been adjusted to ensure the selected edge profile is provided;
   b) defining a window area; and
   c) etching the thin film stack from the window area with a single etchant to achieve the selected edge profile between 30 degrees and 60 degrees.

18. The method of claim 17, wherein the first and the second metal oxide are $Cr_2O_3$; and the first and second metal are chromium.

* * * * *